US010758884B2

(12) United States Patent
Husein et al.

(10) Patent No.: US 10,758,884 B2
(45) Date of Patent: Sep. 1, 2020

(54) PHASE TRANSFER FOR THE PREPARATION OF STABLE NANO-SCALE ORGANOSOLS

(71) Applicant: nFluids Inc., Calgary (CA)

(72) Inventors: Maen Husein, Calgary (CA); Alexey Borisov, Calgary (CA)

(73) Assignee: nFluids Inc., Calgary (CA)

( * ) Notice: Subject to any disclaimer, the term of this patent is extended or adjusted under 35 U.S.C. 154(b) by 85 days.

(21) Appl. No.: 16/098,417

(22) PCT Filed: May 3, 2017

(86) PCT No.: PCT/CA2017/050536
§ 371 (c)(1),
(2) Date: Nov. 1, 2018

(87) PCT Pub. No.: WO2017/190239
PCT Pub. Date: Nov. 9, 2017

(65) Prior Publication Data
US 2019/0143289 A1 May 16, 2019

Related U.S. Application Data

(60) Provisional application No. 62/332,213, filed on May 5, 2016.

(51) Int. Cl.
*B01J 13/00* (2006.01)
*B82Y 30/00* (2011.01)
(Continued)

(52) U.S. Cl.
CPC ............ *B01J 13/003* (2013.01); *B82Y 30/00* (2013.01); *C01G 49/06* (2013.01); *C09K 8/34* (2013.01);
(Continued)

(58) Field of Classification Search
None
See application file for complete search history.

(56) References Cited

U.S. PATENT DOCUMENTS 3,928,220 A    12/1975  Slusarczuk
4,855,079 A     8/1989  Wyman
(Continued)

FOREIGN PATENT DOCUMENTS

WO    2008017679 A1    2/2008

OTHER PUBLICATIONS

PCT International Search Report and Written Opinion, corresponding to PCT/CA2017/050536, dated Aug. 18, 2017, 9 pages.
(Continued)

*Primary Examiner* — Jeffrey D Washville
(74) *Attorney, Agent, or Firm* — Fennemore Craig, P.C.

(57) ABSTRACT

A method for preparing concentrated and stable nanoparticle organosols using phase transfer is disclosed. The method includes transferring nanoparticles from a hydrosol into a hydrocarbon carrier with the aid of a transfer agent. The transfer agent can be added before, during or after the reaction of nanoparticle preparation and can be added to the aqueous or the organic carrier. The nanoparticles may be prepared in situ, pre-prepared in-house or commercially available. At the optimum values of the different parameters; namely precursor concentrations, amount of transfer agent and concentration of nanoparticles in the organosol, complete transfer of the nanoparticles may be achieved. The approach employs room temperature, moderate mixing and minimum number and quantity of chemicals relative to prior art. The nanoparticles may be used in fluids used in oil and gas recovery including drilling, completion, and stimulation fluids.

20 Claims, 3 Drawing Sheets

(51) Int. Cl.

| | |
|---|---|
| C01G 49/06 | (2006.01) |
| C09K 8/34 | (2006.01) |
| C09K 8/82 | (2006.01) |
| B82Y 40/00 | (2011.01) |

(52) U.S. Cl.
CPC ............... C09K 8/82 (2013.01); *B82Y 40/00* (2013.01); *C01P 2002/82* (2013.01); *C01P 2004/04* (2013.01); *C01P 2004/64* (2013.01); *C09K 2208/10* (2013.01)

(56) References Cited

U.S. PATENT DOCUMENTS

| | | |
|---|---|---|
| 6,086,780 A | 7/2000 | Hong et al. |
| 6,136,048 A | 10/2000 | Birchem et al. |
| 6,271,269 B1 | 8/2001 | Chane-Ching et al. |
| 7,459,484 B2 | 12/2008 | Blanchard et al. |
| 2010/0012880 A1 | 1/2010 | Rampersaud et al. |
| 2010/0152077 A1 | 6/2010 | Allston et al. |
| 2013/0337998 A1* | 12/2013 | Irving .................. B01J 13/003 502/167 |
| 2014/0007494 A1* | 1/2014 | D'Alencon .......... B01J 13/0026 44/307 |
| 2014/0054511 A1 | 2/2014 | Chou et al. |

OTHER PUBLICATIONS

Reimers and Khalafalla, "Preparing Magnetic Fluids by a Peptizing Method," U.S. Department of the Interior, Bureau of Mines Innovative Processes in Extractive Metallurgy Program Technical Progress Report-59, Twin Cities Metallurgy Research Center, Minneapolis, Minnesota, Sep. 1972, 17 pages.

Machunsky and Peuker, "Liquid-Liquid Interfacial Transport of Nanoparticles," Hindawi Publishing Corporation, Physical Separation in Science and Engineering, vol. 2007, Article ID 34832, doi: 10.1155/2007/34832, Revised Aug. 29, 2007, Accepted Nov. 8, 2007, 7 pages.

Machunsky et al., "Liquid-Liquid Phase Transfer of Magnetite Nanoparticles," Colloids and Surfaces A: Physicochemical and Engineering Aspects 348 (2009), Contents lists available at ScienceDirect, www.elsevier.com/locate/colsurfa, Revised Jul. 7, 2009, Accepted Jul. 8, 2009, Available online Jul. 16, 2009, pp. 186-190.

* cited by examiner

PHASE TRANSFER FOR THE PREPARATION OF STABLE NANO-SCALE ORGANOSOLS

FIELD OF THE INVENTION

The present disclosure relates generally to a method for preparing nano-scale organosols and the organosols prepared using this method.

BACKGROUND OF THE INVENTION

Nanoparticle compositions are useful in a variety of applications and, particularly, in applications related to the production of oil and gas, including drilling and completion fluids. Nanoparticles have unique size-dependent physical and chemical properties that are typically not encountered in their larger counterparts. Nanoparticle synthesis is particularly sensitive to reaction conditions and parameters. Further, nanoparticle production at a commercial scale faces challenges, such as the lack of homogeneity of synthesis conditions, impurity of the precursor materials, limits of mass transfer between phases, and the difficulty of achieving uniform heating and mixing. Standard industrial-scale processes, such as centrifugation and filtration, are less suitable to nanoparticle production or refinement because of their small sizes. It is therefore desirable to develop a facile, large-scale and low-cost manufacturing process to produce a variety of nanomaterials.

Typical large-scale manufacturing methods of nanoparticles are often complex and involve multiple stages, such as synthesis, purification, drying, calcination, milling and size adjustment, to produce a final product with desirable properties. A number of publications discuss methods of preparing nanoparticles and nanoscale organosols. Although many reports in the literature tackle the preparation of organosols via phase transfer or other methods, these methods are complex and inefficient. They require acidic pH, heating of the mixture to high temperatures, and large quantities of transfer agents.

One of the early reports on organosols preparation via phase transfer is by Reimers and Khalafalla: Preparing Magnetic Fluids by A Peptizing Method (Bureau of Mines, Technical Progress Report 59, September 1972). In this work, heating was required to help with dispersing the aqueous ferromagnetic fluid into the oil phase, e.g. kerosene, containing transfer agent, e.g. oleic acid. Peptization into the organic phase was accomplished by either spraying the freshly prepared aqueous magnetic nanoparticle slurry into the oil phase containing the dispersing agent, or mixing the freshly prepared slurry with the oil phase containing the transfer agent at a correct ratio while heating. Heating typically imposes challenges on scalability of the approach. Different transfer agents were tested during the work of Reimers and Khalafalla; including organics having carboxylic, hydroxyl and amino groups. There was an optimum concentration of the transfer agent, which was 6 vol % to 12 vol % for kerosene. Moreover, there existed an optimum peptizing time depending on the oleic acid content (the more the oleic acid, the more the time needed). At a given concentration of the dispersion agent, increase peptizing time reduced dispersion. The resulting method required heating, did not produce a very stable organosol independent of peptizing time, and did not yield high concentrations of nanoparticles in the organosol.

U.S. Pat. No. 6,271,269 (Chane-Ching et al.) discusses the preparation of stable organosols of metal nanoparticles via phase transfer. The process involves reacting aqueous metal salts with a base to produce a colloidal dispersion of nanoparticles, which are then contacted with an organic medium containing organic acid, e.g. oleic acid. The process is preferably carried out at a temperature range between 60-150° C. The method operates in the acidic pH range (pH <2), wherein nanoparticles possess a positive charge at the surface due to adsorbed $H_3O^+$ ions (Kukkadapu, R. K., Zachara, J. M., Fredrickson, J. K., Smith, S. C., Dohnalkova, A. C., & Russell, C. K., Transformation of 2-line ferrihydrite to 6-line ferrihydrite under oxic and anoxic conditions, American Mineralogist 2003, 88, 1903-1914). Under these conditions, an immiscible organic fatty acid, such as oleic acid, is protonated and tends to form clusters to minimize the total energy of the system. This in turn can shield the reactive carboxylate group and lead to inefficient adsorption onto the nanoparticle surface requiring excess acid to achieve full coverage.

A method for preparing organic colloidal dispersion of iron nanoparticles is disclosed in U.S. Pat. No. 7,459,484 (Blanchard et al.). The process employs the steps of producing an aqueous colloidal dispersion of iron nanoparticles by reacting iron salts with a base and subsequently contacting the aqueous dispersion with an organic phase containing transfer agent, e.g. oleic acid. The method operates preferably at a temperature in the range between 60-150° C. and requires the presence of an aqueous carboxylic acid or an iron organo-complex during the precipitation step. Furthermore, the process is carried out at pH between 6.5-7.5, which is near the isoelectric charge for the nanoparticles. The lack of electrostatic repulsion can lead to nanoparticle agglomeration and destabilization of the colloidal dispersion, thus requiring the addition of carboxylic acid that provides steric stabilization.

US Patent Application No. 2013/0337998 (Irving et al.) discloses the method for production of iron oxide nanoparticle aqueous dispersions and subsequent transfer into an organic phase with the aid of a transfer agent, such as oleic acid. The process requires the presence of an aqueous carboxylic acid during the precipitation step and employs pH in the range between 4-5. The molar ratio of carboxylic acid to iron ions is greater than 2.6. Furthermore, the process uses an additional oxidant.

Despite the progress made to date in improving the nanoparticle manufacturing methods, it would be desirable to provide a simple process that employs few reagents and byproducts, is easy to scale up to industrial quantities, and yields a highly-concentrated and stable product.

SUMMARY OF THE INVENTION

It is an object of the present disclosure to obviate or mitigate at least one disadvantage of previous methods.

The methods disclosed herein prepare stable nanoparticle organosols using phase transfer. The nanoparticles may then be employed in fluids used in the production of oil and gas, particularly, in drilling, stimulation, and completion fluids.

In a first aspect, the present disclosure provides a method for preparing nanoparticle organosols using phase transfer comprising the steps of:

introducing nanoparticles, or precursors of said nanoparticles, into an aqueous solution to produce a colloidal dispersion of nanoparticles;

adjusting the pH of the colloidal dispersion to a pH between 8-10;

reacting the colloidal dispersion with a transfer agent;

adding an immiscible organic carrier fluid;

stirring the reaction mixture until the nanoparticles migrate into the organic phase and an emulsion is formed;

separating the emulsion into two phases comprising a bottom aqueous solution and an upper organic fluid containing the nanoparticles; and collecting the organic colloidal dispersion of nanoparticles.

In another aspect, the present disclosure provides a use of the nanoparticles produced according to the method defined above, in oil-based drilling, completion, or stimulation fluids.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The method of the present invention eliminates several energy-intensive manufacturing steps, uses the minimal number of reagents, does not require heating or vigorous mixing, and readily produces a stable organosol of nanoparticles with concentrations of up to 20% wt/wt.

Although many reports in the literature tackle preparation of organosols via phase transfer or other methods, none matches the simplicity and the efficiency of the current invention. The simplicity of the current methods lies in the use of simple aqueous precipitation reactions with a minimum number and amount of reagents, robustness and wide applicability to different types of organic carrier phases employing the same/similar concentration/amount of additives and extent of mixing (moderate), without the need for heating to help dispersing the particles, except for the case of stearic acid transfer agent due to its high melting point and relatively low solubility in organic carriers at room temperature. The efficacy lies at least in part in the fact that relatively small amounts of the transfer agent is needed to completely transfer and stably disperse as high as 20 wt % nanoparticles into the organic phase.

Generally, the present disclosure provides a method and system for a facile approach for preparing concentrated and stable organosols of different nanoparticles. In one aspect, this method involves transferring freshly precipitated nanoparticles or pre-prepared in-house or commercial nanoparticles from a hydrosol into a hydrocarbon carrier with the aid of a transfer agent. The transfer agent can be added before, during or after the reaction of nanoparticle preparation and can be added to the aqueous phase or the organic carrier. At the optimum values of the different parameters, such as for example precursor concentrations, amount of transfer agent, and concentration of nanoparticles in the organosol, complete transfer of the nanoparticles may be achieved. The approach operates at room temperature (ambient temperature), uses moderate mixing and requires a minimum number and quantity of chemicals relative to prior art methods.

In one aspect of the method, the nanoparticles may be prepared in situ by the addition of nanoparticle precursors or the nanoparticles may be pre-prepared or commercially prepared nanoparticles. The nanoparticle precursors or commercially prepared nanoparticles are added to an aqueous solution to produce a colloidal dispersion of nanoparticles. The pH of the colloidal suspension is adjusted to a pH of between 8-10. In one embodiment, the pH is above 8. In another embodiment, the pH is below 10. Preferably the pH is between 9-10. The colloidal dispersion of nanoparticles is reacted with a transfer agent. An immiscible organic carrier fluid is added. The reaction mixture may be stirred until the nanoparticles migrate into an organic phase and an emulsion is formed. The emulsion is separated into two phases consisting of a bottom aqueous solution of a byproduct salt and an upper organic fluid of nanoparticles. The upper organic fluid may contain up to 20 wt % of nanoparticles. Phase separation can be induced for example by adding a small amount of hydroxyl ions, heating the mixture to about 65-70° C., or adding a small amount of demulsifier. The organic colloidal dispersion of nanoparticles is collected for example via decantation.

The organic colloidal dispersion of nanoparticles may be used in suitable oil based drilling fluids, drill-in, completion, or stimulation fluids for use in downhole operations.

Nanoparticles are generally characterized as having a mean diameter of less than 100 nm. In one aspect, the nanoparticles have a diameter of less than 10 nm. In another aspect, the nanoparticles have a diameter of less than 5 nm. In a further aspect, the nanoparticles have a diameter of 3-5 nm.

The nanoparticles may be any suitable nanoparticles for the intended use. Non-limiting examples include metal hydroxides, metal oxides, metal carbonates, metal sulfides, metal sulfates, and mixtures thereof. In one aspect, the nanoparticle is ferrihydrite and the nanoparticle precursors are iron (III) ions and hydroxyl ions. The source of the iron ions may be ferric chloride, ferric nitrate, ferric sulfate, and hydrates thereof. The source of the hydroxyl ions may be sodium hydroxide, potassium hydroxide and ammonium hydroxide. In a further aspect of the invention, the nanoparticle is magnetite, $Fe_3O_4$, and is prepared at room temperature from a mixture of iron (III) and iron (II) ions in a 2:1 molar ratio. Carbonate nanoparticles were equally conveniently prepared either from their aqueous precursors or via $CO_2$ bubbling through a metal hydroxide precursor. Given the fact that $CaCO_3$ and $BaCO_3$ nanoparticles obtained by bubbling $CO_2$ into an aqueous solution of the precursor metal hydroxide could be as readily transferred into the oil phase as the ones prepared from aqueous precursors, the high ionic strength associated with the byproduct salt may not be necessary to transfer the capped particles into the organic carrier.

In one aspect, the pH of the aqueous colloidal suspension may be adjusted to 8-10, in another aspect to between 9-10, and in a further aspect to a pH of 9.5.

In one aspect, the transfer agent may be carboxylic acid. The carboxylic acid may be selected from $C_{6-22}$ saturated or unsaturated fatty acids, including hexanoic acid, octanoic acid, decanoic acid, lauric acid, myristic acid, palmitic acid, stearic acid, oleic acid, linoleic acid, ricinoleic acid, arachidic acid, behenic acid and mixtures thereof. It is preferable to use carboxylic acid that is in a liquid form at the temperature range of the process to simplify manufacturing steps. Fourier transform infrared (FT-IR) spectroscopy results suggest that, in both the aqueous and the organic phase, the carboxylate group was attached to the surface of the nanoparticles. Although such an orientation did not confer stability onto the hydrosol, it may contribute to effective migration of the capped particles to the organic carrier.

In line with the above point, and unlike cases where orientational flexibility was essential for nanoparticle dispersion, stearic acid showed the same effectiveness as a transfer agent.

It has been found that by using the method set out herein, the molar ratio of the transfer agent to the nanoparticles is significantly lower than that required in the prior art. In one aspect, the molar ratio of transfer agent to nanoparticle ions is about 0.15 or greater. In a further aspect, the molar ratio is about 0.2 or greater. While higher amounts of the transfer agent may be used, they are not required. The present method provides a more efficient use of the transfer agent in preparing the organosol that those methods set out in the prior art described above.

In a further aspect, the volume ratio of the transfer agent to the organic carrier may be less than 15%.

In an aspect of the present method, the immiscible organic carrier fluid may be a low polarity organic carrier. It may be selected from $C_{6-24}$ hydrocarbons, including n-hexane, cyclohexane, heptane, octane, hexadecane, octadecane, xylene, toluene, benzene, 1-octadecene, dichloromethane, poly-α-olefin, mineral oil, diesel oil, gas oil or mixtures thereof. It was found that the process was applicable to many organic solvents with a minimum adjustment of process parameters. For example, the organic carrier can be chosen as a pure solvent such as hexane or base oils from drilling industry such as Cutter-D, Distillate 822, etc.

Stirring of the reaction mixture may only require moderate speed. For example, 200-300 rpm may be sufficient to achieve complete phase transfer. This level of mixing can be easily achieved in an industry scale.

In one aspect of the method, no heating is needed to prepare the aqueous dispersion of nanoparticles or to transfer the nanoparticles to the organic carrier, unless the melting point of the transfer agent is higher than room temperature. The process may therefore be carried out at ambient temperature. In a further aspect, no drying of the nanoparticles is needed before transferring them to the organic phase. Further, adsorbed moisture on the nanoparticles may not compromise the transfer process or the stability of the organosol. Emulsified water can be removed using for example gravity separation, excess alkali, mild heat treatment or commercial de-emulsifiers.

In a further aspect, the order of addition of the reagents may not be detrimental for the phase transfer step. In a further aspect, the transfer agent is preferably added to the organic phase, while the hydroxide source is added to the aqueous phase. This method may be performed in a single reaction vessel, if desired, which may result in savings in cost and reduction of complexity. There is a limited number of chemicals that are required, including precursors, water, transfer agent and an organic carrier. The method does not require acid or a salt of the acid, ligand exchange, encapsulation or other chemicals required in the prior art methods to promote transfer of the nanoparticles to the organic carrier. Furthermore, the method is robust and can tolerate technical grade chemical precursors and impurities.

The method results in an effective transfer of the nanoparticles from the aqueous phase to the organic carrier. The effective transfer can be higher than that shown in the prior art methods with a higher concentration of nanoparticles in the organic carrier. The achieved transfer ratio may be as high as 100%. It was shown that the method may produce a complete phase transfer, independent of the ionic strength of the aqueous phase. All the nanoparticles may transfer from the aqueous phase to the organic carrier phase. This left an optically clear residual aqueous phase with potential advantages. The advantages of high transfer efficiency include: economic advantages of less waste, ease of disposal of aqueous by-product, environmental considerations, and ease of quality control.

EXAMPLES

It should be noted that the physical state, purity and concentrations presented thereof should not limit the generality of the approach. Different laboratory grade and technical grade precursors were employed and all showed same results.

Example 1. Preparation of Ferrihydrite Organosols

In a typical run, an amount of 15.3 g (94.3 mmol) of anhydrous ferric chloride, $FeCl_3$, was dissolved in tap water to obtain 100 g of solution (15.3 wt %). An aqueous solution of sodium hydroxide was prepared by dissolving 11.5 g (287.5 mmol) NaOH pellets into tap water to obtain 100 g of solution (11.5 wt %). Due to the exothermic nature of the reaction, both solutions were brought to room temperature (~23° C.) prior to use. Mixing, by a stirring bar, was set to ~800 rpm, and the NaOH solution was rapidly added to the FeCl3 solution. The reaction mixture initially gelled, but the continuous mixing was sufficient to break up the gel and a deep-red, smooth hydrogel appeared in approximately 10 s. After 5 min of mixing, 40 mL of a hydrocarbon carrier, e.g. hexane, diesel, mineral or synthetic base oils, etc. containing 7.5 mL (6.7 g or 23.7 mmol) of oleic acid were added, and mixing speed was reduced to 300 rpm. It should be noted that the order of the addition of oleic acid does not make a difference and oleic acid can be added before, during or after the reaction and can be added to the aqueous or the organic carrier. Phase separation was normally completed within 15 min from addition of organic phase rendering very clear aqueous phase and dark red organosol. Adding few drops of a base helped activating the oleic acid and, hence, the transfer of the nanoparticles. Phases could be separated using separatory funnel. A 100% transfer ratio of the nanoparticles was confirmed by the final pH of the aqueous by-product phase (~pH=9-10) coupled with the very clear transparent appearance and the absence of any bulk solid precipitate in that phase.

Example 1a. Ferrihydrite Organosols: Effect of Precursor Concentration

To ensure scalability and cost-effectiveness of the process, it was desirable to minimize the reaction volume by using the highest concentration of precursors possible. Experiments have shown that 1 M $FeCl_3$ and 5 M NaOH provided the optimal conditions for the reaction. These concentrations corresponded to ~5.9 wt % theoretical, assuming the formula weight of $Fe(OH)_3$ of 106.87 g/mol, concentration of ferrihydrite nanoparticles in the aqueous dispersion. At concentrations exceeding 5.9 wt %, viscosity of the reaction mixture became too high, which resulted in inefficient mixing. Conversely, low concentrations of $FeCl_3$ (e.g. 0.1 M) and NaOH (e.g. 1 M) did not affect the process and led to a complete phase transfer and emulsification.

Example 1b. Ferrihydrite Organosols: Effect of pH

Effect of pH on the efficiency of the phase transfer process was investigated in the range between pH=2 and pH=12. Since oleate is an anionic surfactant, it was expected that it would adsorb onto positively charged particles. The point zero charge (PZC) of 2-line ferrihydrite is around $pH_{PZC}$ 8 (Kukkadapu et al., Transformation of 2-line ferrihydrite to 6-line ferrihydrite under oxic and anoxic conditions, American Mineralogist 2003, 88, 1903-1914). Below the PZC, the surface of nanoparticles contains positively charged —$H_3O^+$ groups, while at pH above ~8 the surface contains —$OH^-$ groups.

A series of experiments was conducted to test the hypothesis. First, sodium hydroxide was titrated into ferric chloride solution to pH=7, which corresponded to a complete conversion of iron ions to ferrihydrite. Then, pH was adjusted to above or below the PZC by the addition of either 1 M HCl or 5 M NaOH, and an organic carrier containing the oleic acid was added. The results indicated that the phase transfer either did not occur or was incomplete for pH <9. Conversely, at pH >11, phase transfer occurred quickly, but the organic phase following separation was thick and heterogeneous, and tended to gel with time. Consequently, optimum pH to achieve a complete phase transfer was determined in the range of 9-10, with the optimal value of 9.5. Without being bound by theory, given the FT-IR results which confirm carboxylic acid group adsorbed onto the ferrihydrite nanoparticles, it is believed that an alkaline environment deprotonates the fatty acid and forms a water-soluble oleate salt in situ. Carboxylate ions provide electrostatic repulsion, which increases the intermolecular distance and reduces the propensity of fatty acid to arrange into aggregates, making it easier for the polar group to react with the iron oxide surface. Furthermore, alkaline metal cation may play an important role in forming a counterion layer around the negatively-charged nanoparticles that chemically binds oleate via a cation bridge. The believed mechanism differs from processes employed in prior methods, wherein an oleic acid transfer agent was used under acidic conditions. Given the $pK_a$ of oleic acid of 9.85 (Kanicky and Shah, Journal of Colloid and Interface Science 2002, 256, 201-107), it may exist in a protonated form and therefore may react with the iron oxide surface via a different reaction pathway.

Example 1c. Ferrihydrite Organosols: Effect of Molar Ratio of $Fe^{3+}$ to Oleic Acid Oleic acid is a capping and transfer agent that adsorbs onto the ferrihydrite nanoparticles and facilitates phase transfer to the organic phase. The molar ratio of $Fe^{3+}$ to oleic acid was varied to find the minimum amount of fatty acid at which phase transfer could be achieved. Results showed that phase transfer was complete at a molar ratio of $Fe^{3+}$ to oleic acid of 5-6. Conversely, increasing the amount of oleic acid did not improve the efficiency of the process and was not necessary. It should be noted that a control experiment without oleic acid still led to complete emulsification of the mixture, but phase transfer did not take place and the organic phase, separated by centrifugation, did not contain any nanoparticles.

Example 1d. Ferrihydrite Organosols: Effect of the Concentration of the Organic Carrier The volume of the organic carrier was varied to maximize the concentration of the ferrihydrite nanoparticles in the final product following phase transfer. The FT-IR experiments suggested that adsorption of oleic acid onto the ferrihydrite nanoparticles can occur in the absence of the organic carrier. However, when the capped particles were left in the aqueous phase, they tended to coalesce within 10 min into a sticky, immobile mass in order to minimize their free surface energy. Consequently, they could not be easily completely transferred into the organic carrier. The issue was circumvented by dissolving the transfer agent into an organic phase. The complete phase transfer was achieved at the minimum ratio of organic fluid to ferrihydrite nanoparticles, which corresponded to 21.2 wt % nanoparticles in the organic carrier. Using larger volumes of the carrier did not provide any advantages.

Example 1e. Ferrihydrite Organosols: Effect of Mixing Speed

Mixing is required to achieve mass transfer of the ferrihydrite nanoparticles across the interfacial region. Using a magnetic stirrer and high mixing rates, up to 1,000 rpm, led to faster mass transfer, but also resulted in a more stable emulsion, which tended to be harder to break. On the other hand, mixing rates below 150 rpm did not produce enough agitation to ensure sufficient mass transfer, and phase transfer was incomplete even after several hours of mixing. The optimal phase transfer was achieved at a mixing speed between 200-300 rpm, which is compatible with most industrial stirring equipment.

Example 1f. Ferrihydrite Organosols: Use of Stearic Acid as the Transfer Agent A 10 g mass of ferrihydrite nanoparticles precipitated from an aqueous solution and transferred to a carrier oil, e.g. D822 base oil, with the aid of stearic acid, was prepared as follows. Aqueous ferric chloride, $FeCl_3$, solution of 15 wt % was prepared by diluting 40 g of 38.93 wt % $FeCl_3$ solution (UNIVAR) with tap water to 100 g. Aqueous sodium hydroxide, NaOH, solution of 12 wt % was prepared by diluting 24 g of 50 wt % NaOH solution (UNIVAR) with tap water to 100 g. The NaOH solution was rapidly added to the $FeCl_3$ solution at room temperature and mixed at 600 rpm using a stirring bar. Deep-red, uniform aqueous suspension of ferrihydrite nanoparticles formed within 30 s of the reaction and the pH of the final suspension was pH ~9.6 (up from pH=1.2 for the $FeCl_3$ precursor). A mass of 6.6 g (23.2 mmol) of stearic acid flakes (Sigma-Aldrich) was added to 40 mL of D822 base oil, and the mixture was heated to 70° C. to help dissolving the stearic acid. The organic solution was removed from the hot plate and poured onto the aqueous suspension of ferrihydrite nanoparticles. Mixing speed was reduced to 300 rpm. After 15 to 30 min a solid gelatinous mass appeared, but the aqueous phase still contained a relatively high concentration of ferrihydrite nanoparticles, as flagged by its color. The mixture was placed on a hot plate and mixed for 1 h at 70-80° C. At the end of heating, the beaker was set aside, and clean phase separation occurred within 5 min. The red organic phase (~50 mL) was decanted into a clean glass vial for observation. The remaining aqueous phase was clear and colourless, thus suggesting 100% transfer ratio. After 30 min of storage, the ferrihydrite nanoparticle organosol gelled and solidified, and was not readily dispersible in organics. Heat was required to reduce the viscosity and render it free-flowing once again.

Example 2. Preparation of Magnetite Organosols

Figure 2:
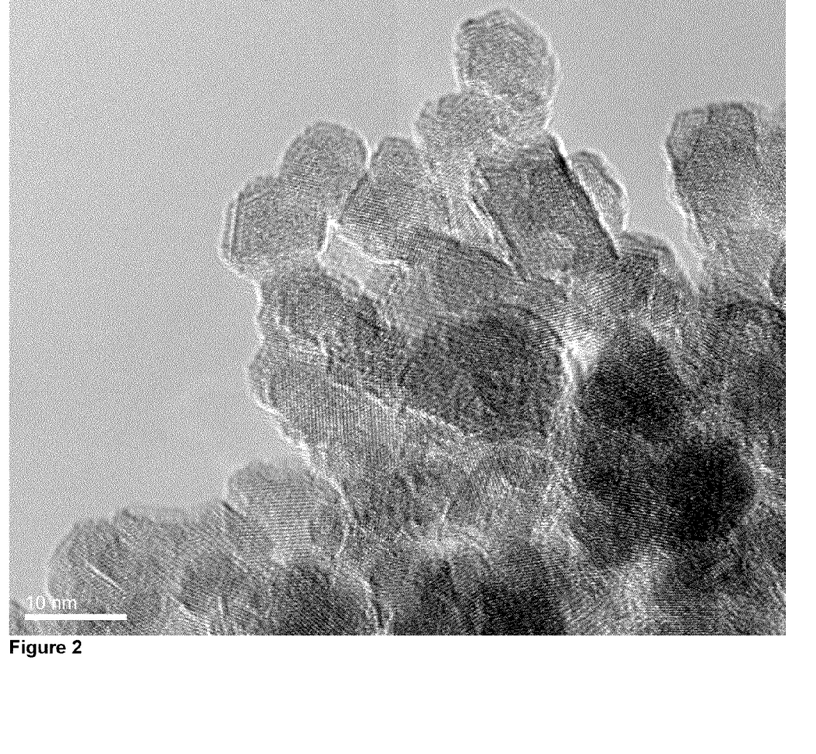
FIG. 2 shows HRTEM image of magnetite NPs produced via process of the invention at room temperature. The micrograph shows lattice fringes that are characteristic of crystalline materials.
Figure 3A:
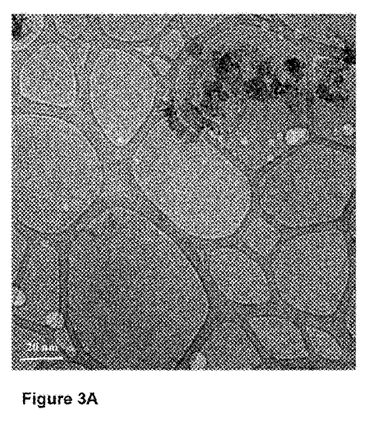
FIGS. 3a and 3b are cryo-TEM micrographs of ferrihydrite nanoparticles synthesized in an aqueous phase, capped with oleic acid (4:1 $Fe^{3+}$:OA molar ratio) and phase transferred into hexane.
Figure 3B:
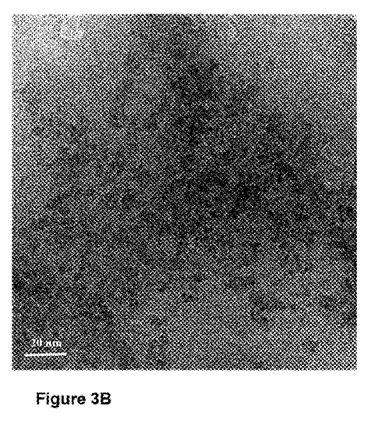

Magnetite, $Fe_3O_4$, organosols were prepared at ambient temperature according to the method of Example 1 and only substituting the ferric moles with a 2:1 molar ratio of $FeCl_3$ and $FeCl_2$. Transmission Electron Microscopy analysis of the product revealed spherical particles with the average size of about 10 nm (FIG. 2). The presence of lattice fringes suggested that crystalline magnetite nanoparticles can be conveniently manufactured at an ambient temperature and in high yield.

Example 3. Preparation of Calcium Carbonate ($CaCO_3$) Organosols Starting from Aqueous Precursors Equal volumes (10 mL) of stoichiometric amounts of aqueous $CaCl_2$ (1.11 g, 0.1 M) and $K_2CO_3$ (1.38 g, 0.1 M) were mixed in a glass beaker at room temperature at 600 rpm. White precipitate formed instantly. Oleic acid at a ratio of 0.6 g/1 g of the carbonate product was added, followed by the addition of an organic carrier, e.g. hexane, diesel, mineral or synthetic base oils, etc. at a ratio of 4 mL/1 g of the product carbonate. The mixture was kept stirring at room temperature and 300 rpm, and phase transfer was complete within 10 min. Phases could be separated using separatory funnel. A 100% transfer ratio of the nanoparticles was confirmed by the final pH of the aqueous by-product phase (pH=7) coupled with the very clear transparent appearance and the absence of any bulk solid precipitate in that phase, even when carbonate ion is titrated into the phase.

Example 4. Preparation of Calcium Carbonate ($CaCO_3$) and Barium Carbonate ($BaCO_3$) Organosols Starting from the Aqueous Metal Hydroxide Precursor Via $CO_2$ Bubbling Hydrated lime (7.5 g, 0.1 mol), or barium hydroxide monohydrate (9.6 g, 0.05 mol), was dissolved in 200 mL of tap water and $CO_2$ was bubbled at 1-1.5 L/min. After the reaction was complete, once the pH meter stabilizes at pH=7, oleic acid at a ratio of 0.6 g/1 g of the carbonate product, followed by an organic carrier, e.g. hexane, diesel, mineral or synthetic base oils, etc. at a ratio of 4 mL/1 g of the carbonate product were added to the suspension. The mixture was stirred at 300 rpm, and phase transfer was complete within 10 min. Phases could be separated using separatory funnel. A 100% transfer ratio of the nanoparticles was confirmed by the final pH of the aqueous by-product phase (pH=7) coupled with the very clear transparent appearance and the absence of any bulk solid precipitate in that phase, even when carbonate ion is titrated into the phase.

Analysis

Figure 1:
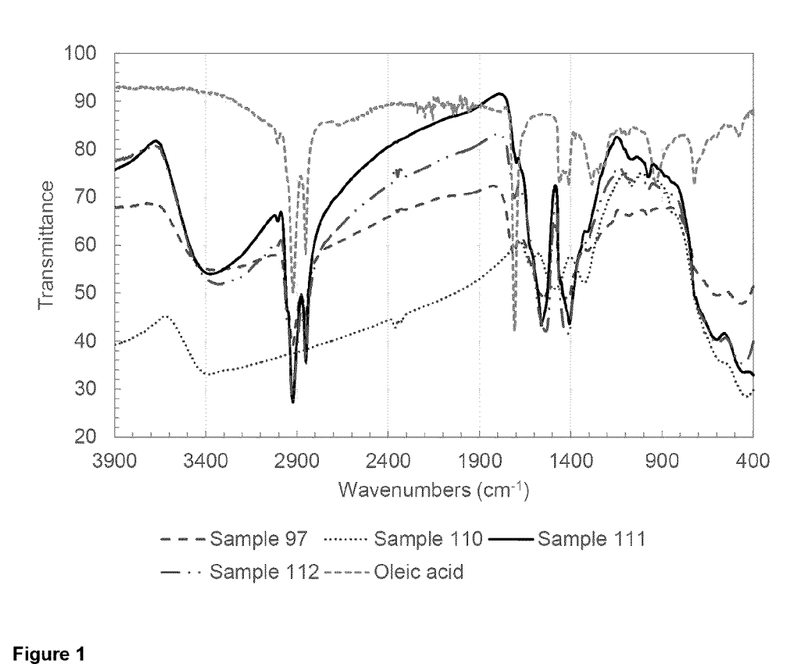
FIG. 1 is a graph showing the FT-IR spectra for oleic acid-capped ferrihydrite nanoparticles extracted from carrier organic phase (samples 97 and 111) and from aqueous phase (sample 112) with the corresponding control samples of oleic acid and ferrihydrite nanoparticles (sample 110).

FT-IR spectroscopy. In order to help identifying the nature of the interaction between the transfer agent, e.g. oleic acid (OA), and the surface of the nanoparticles, e.g. ferrihydrite, and the orientation of the transfer agent adsorbed onto the nanoparticles, Fourier Transform InfraRed (FT-IR) spectroscopy was carried out for three oleic acid-capped ferrihydrite nanoparticles and two control samples: a control sample of ferrihydrite nanoparticles, sample 110, and another of the as received oleic acid (technical grade, 90% purity, Sigma-Aldrich, Canada). Sample 110 consisted of bare ferrihydrite nanoparticles synthesized in an aqueous phase. Separated via centrifugation, repeatedly washed with DI water (4 times) and ethanol (2 times) to remove impurities and dried under ambient conditions. Samples 97 and 111 consisted of ferrihydrite nanoparticles synthesized in an aqueous phase, capped with oleic acid (4:1 $Fe^{3+}$:OA molar ratio) and phase transferred into hexane. The hexane phase was evaporated under ambient conditions. Sample 112 ferrihydrite nanoparticles synthesized in an aqueous phase and capped with oleic acid (4:1 $Fe^{3+}$:OA molar ratio). Capped particles were collected via centrifugation, washed with DI water (4 times) and ethanol (2 times) to remove impurities and dried under ambient conditions. The results are shown in FIG. 1.

The FT-IR spectroscopy displays no major differences among the oleic acid-capped particles collected from the aqueous or the organic phases. Hence, it is concluded that there is no orientation switch of the capping agent between the aqueous and the organic phase and the orientational flexibility observed earlier for silver nanoparticles (Wei Wang, Shlomo Efrima, and Oren Regev, Directing Oleate Stabilized Nanosized Silver Colloids into Organic Phases, Langmuir 1998, 14, 602-610; Wei Wang, Xiao Chen, and Shlomo Efrima, Silver Nanoparticles Capped by Long-Chain Unsaturated Carboxylates, J. Phys. Chem. B 1999, 103, 7238-7246) is not a must to achieve nanoparticle transfer using the current approach. The FT-IR results for the capped nanoparticles confirm the existence of peaks at 2922 $cm^{-1}$ and 2853 $cm^{-1}$, which are characteristic of the —$CH_2$ stretch, while the —$CH_3$ stretch is evident at 1,410 $cm^{-1}$ (Shukla S, Arora V, Jadaun A, Kumar J, Singh N, Jain V K, Magnetic removal of Entamoeba cysts from water using chitosan oligosaccharide-coated iron oxide nanoparticles, International Journal of Nanomedicine, 31 Jul. 2015 Volume 2015: 10(1) Pages 4901-4917). There is a shift in the absorption peak at 1710 $cm^{-1}$ for free oleic acid (Ayman M. Atta, Gamal A. El-Mandy, Hamad A. Al-Lohedan, and Ashraf M. El-Saeed, Preparation and Application of Cross-linked Poly(sodium acrylate)-Coated Magnetite Nanoparticles as Corrosion Inhibitors for Carbon Steel Alloy, Molecules 2015, 20(1), 1244-1261) to 1540 $cm^{-1}$, which is a characteristic of the symmetric carboxylate group stretching (Miao Wang, Ming-Li Peng, Wu Cheng, Ya-Li Cui and Chao Chen, A novel approach for transferring oleic acid capped iron oxide nanoparticles to water, J Nanoscien Nanotech, 2011, 11, 3688-3691). This shift suggests chemical adsorption of the carboxylate group, especially in light of the peak at 596 $cm^{-1}$, which is a characteristic of Fe—O stretching (Miao Wang, Ming-Li Peng, Wu Cheng, Ya-Li Cui and Chao Chen, A novel approach for transferring oleic acid capped iron oxide nanoparticles to water, J Nanoscien Nanotech, 2011, 11, 3688-3691).

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for preparing nanoparticle organosols using phase transfer, comprising:
    introducing nanoparticles, or precursors of said nanoparticles, into an aqueous solution to produce a colloidal dispersion of nanoparticles;
    adjusting the pH of the colloidal dispersion to a pH between 8-10;
    reacting the colloidal dispersion with a transfer agent;
    adding an immiscible organic carrier fluid;
    stirring the reaction mixture until the nanoparticles migrate into the organic phase and an emulsion is formed;
    separating the emulsion into two phases comprising a bottom aqueous solution and an upper organic fluid containing the nanoparticles; and
    collecting the organic fluid colloidal dispersion of nanoparticles, and
    wherein the step of separating the emulsion further comprises adding a demulsifier to the emulsion.

2. The method of claim 1, wherein the nanoparticles are selected from metals and their water insoluble oxides, hydroxides, carbonates, sulfides, sulfates and combination thereof.

3. The method of claim 1, wherein the nanoparticles are made in situ by adding the precursors to the aqueous phase.

4. The method of claim 1, wherein the nanoparticles are pre-prepared nanoparticles or commercially prepared nanoparticles.

5. The method of claim 1, wherein transfer agent is a carboxylic acid.

6. The method of claim 1, wherein the carboxylic acid is selected from the group consisting of $C_{12-22}$ fatty acids, including lauric acid, myristic acid, palmitic acid, stearic acid, oleic acid, linoleic acid, ricinoleic acid, arachidic acid, behenic acid and mixtures thereof.

7. The method of claim 1, wherein the molar ratio of the transfer agent to the nanoparticles is 0.15 or greater.

8. The method of claim 1, wherein the pH of the aqueous phase is adjusted to between 9 and 10.

9. The method of claim 1, wherein the organic carrier is a low-polarity fluid selected from the group consisting of $C_{6-24}$ hydrocarbons, including n-hexane, cyclohexane, heptane, octane, hexadecane, octadecane, xylene, toluene, benzene, 1-octadecene, dichloromethane, poly-α-olefin, mineral oil, diesel oil, gas oil and mixtures thereof.

10. The method of claim 1, wherein the volume ratio of the transfer agent to the organic carrier is equal to or less than 15%.

11. The method of claim 1, wherein the separated organic fluid contains from 15-20 wt % suspended, un-agglomerated nanoparticles.

12. The method of claim 1, wherein the nanoparticles have a mean diameter of less than 100 nm.

13. The method of claim 1, wherein the method is carried out at room temperature.

14. The method of claim 1, wherein the nanoparticles are transferred to the organic phase without drying the nanoparticles.

15. The method of claim 1, wherein the emulsified water is removed using gravity separation, excess alkali, mild heat treatment or commercial de-emulsifiers.

16. The method of claim 1, wherein the transfer agent is added to the organic phase and a hydroxyl source is added to the aqueous phase.

17. Nanoparticles produced using the method according to claim 1.

18. A use of the nanoparticle organosol produced according the method defined in claim 1, in oil-based drilling, completion, or stimulation fluids.

19. The method of claim 7, wherein the molar ratio of the transfer agent to the nanoparticles is 0.2 or greater.

20. The method of claim 12, wherein the nanoparticles have a mean diameter of less than 5 nm.

* * * * *